United States Patent [19]

Beranger et al.

[11] 4,072,739

[45] Feb. 7, 1978

[54] PROCESS FOR THE REMOVAL OF URANIUM CONTAINED IN HOMO- AND CO-POLYMERS OF MONO- AND DIOLEFINES

[75] Inventors: Alessandro Béranger; Agostino Balducci; Silvano Gordini, all of San Donato Milanese, Italy

[73] Assignee: Snamprogetti, S.p.A., Milan, Italy

[21] Appl. No.: 601,205

[22] Filed: Aug. 1, 1975

[30] Foreign Application Priority Data

Aug. 2, 1974 Italy .................................. 25940/74

[51] Int. Cl.² .............................................. B01D 11/04
[52] U.S. Cl. .......................................... 423/8; 423/15
[58] Field of Search ................................. 423/8, 15, 17; 260/96 R, 94.7 A, 94.7 N

[56] References Cited

U.S. PATENT DOCUMENTS

| | | | |
|---|---|---|---|
| 2,227,833 | 1/1941 | Hixson et al. | 423/8 |
| 2,901,314 | 8/1959 | Vavalides | 423/8 |
| 2,918,349 | 12/1959 | Seaborg | 423/8 |
| 3,288,569 | 11/1966 | Henrickson et al. | 423/17 |
| 3,309,348 | 3/1967 | Wentz | 260/94.7 |
| 3,743,631 | 7/1973 | Beck et al. | 260/94.7 N |
| 3,801,520 | 4/1974 | Hogan et al. | 260/94.7 N X |

*Primary Examiner*—Richard E. Schafer
*Attorney, Agent, or Firm*—Ralph M. Watson

[57] ABSTRACT

The invention relates to the purification of homo- and copolymers of mono- and diolefines, as obtained from a solution polymerization in the presence of uranium catalysts, from the catalyst residues, and particularly to a process for the removal of the uranium from the hydrocarbon solution of the polymer, which solution is mixed with an aqueous solution of ammonium carbonate, the thus resulting aqueous phase being then separately treated for the recovery of the ammonium carbonate and of the uranium.

5 Claims, 1 Drawing Figure

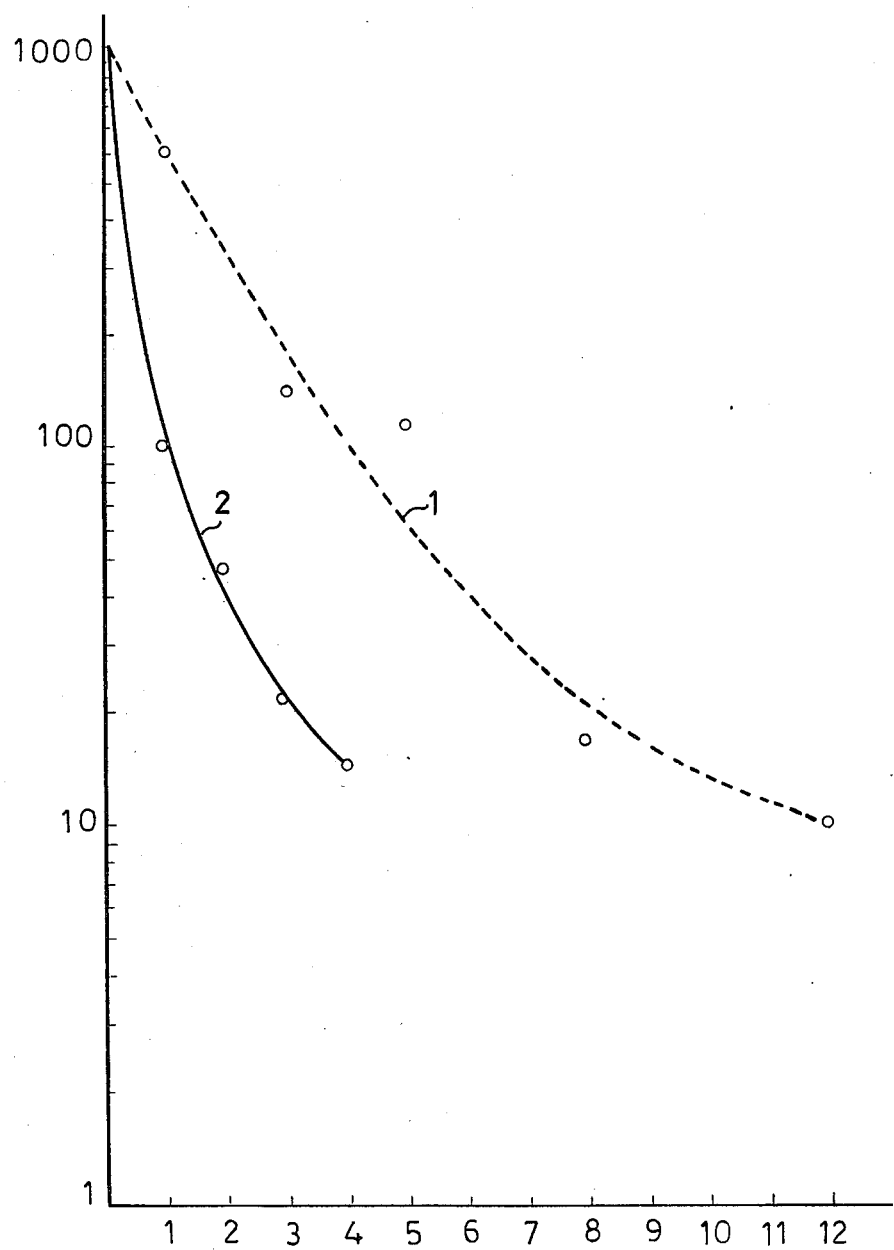

PROCESS FOR THE REMOVAL OF URANIUM CONTAINED IN HOMO- AND CO-POLYMERS OF MONO- AND DIOLEFINES

The present invention relates to a process for the removal of the uranium contained in homopolymers and copolymers of mono- and diolefines. It is known that compounds containing uranium can be used as the catalysts for the prepration of these homo- and copolymers, and the polymerization takes place in a hydrocarbon solution.

More particularly in the Italian Pat. No. 946,105 (Nov. 26, 1971) and in the Italian application No. 32206 (1972) and corresponding U.S. Pat. No. 3,935,175 a novel class of catalysts useful for the synthesis of homo- and copolymers of mono- and diolefines is described, these polymers being characterized by high steric purity and very good technological properties.

These catalysts comprise uranium derivatives, particularly tetrallyl uranium and tetramethoxyl uranium in combination with reducing compounds of metals of the 2nd and 3rd groups of the Periodic System and of Lewis acids. Among the catalyst residues which can be found in the end product, the uranium can be particularly objectionable, since, as is the case with other transistion metals, it is capable of affecting the resistance to the oxidative decomposition and the colour during the ageing of the polymers and, moreover, shows some toxicity with respect to the living organisms.

It is thus of relevent practical interest to provide a method for the removal from the polymers, manufactured according to the known prior art, of the uranium released from the catalytic system and the quantitative recovery thereof from the plant wastes.

The methods commonly used according to the known prior art for the removal of the catalyst residues from a polymeric solution, such as neutral, acid or alkaline washing, require exceedingly high amounts of water and, as in the case of the acid washing, may be the cause of corrosion of the plant parts used to this end. Furthermore the separation of the wash waters from their uranium content before the discharge into a sewage system becomes very difficult.

Even the centrifugation, which is a characterizing feature of the afore mentioned invention, is dependant upon fulfilling the condition that the polymer concentration in the hydrocarbon solvent is low, so as to limit the viscosity of the solution and allow feasible centrifugation times.

Under the practical conditions of a solution polymerization (10–15% solids), the recourse to the centrifugation would therefore involve the preventive dilution of the polymer mixture, with the consequent increase of the costs of the polymer recovery operation.

A process has now been found for the treatment of hydrocarbon solutions of polymer, even when concentrated, in order to remove uranium therefrom in an essentially complete manner and to recover it from the waste waters without facing the previously described drawbacks.

The present invention comprises the steps of mixing, under vigorous stirring, the hydrocarbon solution of the polymer to be purified with an aqueous solution of ammonium carbonate in a volume ratio of between 0.1 and 10, preferably 1. The content of ammonium carbonate in the aqueous solution is between 1% and the saturation limit at the operating temperature, this content being preferably about 5%.

The temperature can be the room temperature, although the highest temperature compatible with the polymer stability and with the vapour pressure of the mixture is preferred. Moreover, the stoichiometric composition of the salt is not a limiting factor and it is possible to carry out the operation with an excess of either $CO_2$ or ammonia with respect to the stoichiometric ratio of the ammonium carbonate. The mixture is then separated into two phases in a gravity settling tank or by centrifugation and the organic phase is furthermore washed until the uranium present is completely removed.

The wash waters contain, in a soluble form, all the uranium separated from the polymer. They are then passed to recovery section, in which the heat needed for the deccomposition of the ammonium carbonate and the distallation of $CO_2$ and $NH_3$ is supplied either by indirect heating or by steam stripping. The vapours thus collected and condensed contain almost all the ammonium carbonate which is recycled to the section of mixing with the hydrocarbon solution. The aqueous phase obtained in the recovery section contains all the uranium in insoluble and filterable form.

The invention now be illustrated in non limiting manner by the following examples.

The expression "ppm" means "parts per million by weight".

EXAMPLE No. 1

Centrifugation test

A 9% by weight polybutadiene solution, as prepared by using a catalyst of allyl uranium according to Italian Pat. No. 946,105, is centrifugated under nitrogen atmosphere in a laboratory centrifuge at 6,160 rpm (average centrifugal force = 2,540 g) for 30 minutes.

The test is repeated in the presence of air:

|  | Total ashes | Uranium |
|---|---|---|
| Initial uranium | 0.18% | 352 ppm |
| After centrifugation under nitrogen | 0.12% | 288 ppm |
| After centrifugation in air | 0.12% | 282 ppm |

EXAMPLE No. 2

Filtration test

A polybutadiene solution prepared as in the Example 1 and having a concentration of 8% by weight is filtered through a stainless steel 325 mesh net. The test is repeated by adding 0.5% by weight of active carbon.

|  | Total ashes | Uranium |
|---|---|---|
| Initial solution | 0.27% | 132 ppm |
| After filtration | 0.25% | 119 – 113 ppm |
| After filtration with carbon addition | 0.22% | 76 ppm |

EXAMPLE No. 3

Tests of aqueous washing with several washing agents

A polybutadiene solution having 10% solid content is washed with equal volumes of aqueous solutions of several washing agents. After separation of the aqueous phase, the polymer solution is again washed several times, under the same conditions, with distilled water in order to completely remove the mother waters.

The following results are obtained:

| Agent | No. of washings with distilled water | Total ashes | Uranium |
|---|---|---|---|
| Initial solution | | 0.14% | 201 ppm |
| $(NH_4)_2CO_3$ 1% | 6 | 0.12% | 13 ppm |
| $Na_2CO_3$ 10% | 9 | 0.14% | 52 ppm |
| $Na_2SO_4$ 10% | 4 | 0.11% | 145 ppm |
| $H_2SO_4$ ph 3,45 | 5 | 0.10% | 117 ppm |

According to the present test the only agent capable of reducing the final uranium content in the polymer to less than the analytical limit is the ammonium carbonate.

EXAMPLE No. 4

Acid washing and washing with ammonium bicarbonate

In a 30 liters glass washing tank a given volume of hexane solution with a polymer content of 8.2% by weight was stirred with an equal volume of aqueous $H_2SO_4$ of pH 2.7 for 15 minutes.

After 30 minutes of settling time, the aqueous phase is separated and a sample of the polymer solution is taken for the analysis of the uranium present and the washing is repeated with an equal volume of acidic water.

This operation is repeated several times.

The washings with a 1% ammonium bicarbonate solution are similarly carried out.

In the accompanying drawing the uranium concentration in the polymer in the case of the acidic washing (curve 1) and in the case of the washing with bicarbonate (curve 2) is plotted; 1, 2, 3, 4 . . . , 12 = number of washings; 1, 10, 100, . . . , 1000 ppm of uranium.

EXAMPLE No. 5

A sample of hexane solution having a polybutadiene content of 14.5% by weight and having an uranium content of 255 ppm, referred to the polymer, is treated with an equal volume of 5% $(NH_4)HCO_3$ aqueous solution in a stainless steel washing tank. The operating conditions are as follows:

| | |
|---|---|
| Temperature | 70 ° C |
| Diameter of the washing tank | 100 mm |
| Diameter of the six bladed rotor | 72 mm |
| Volume of the washing tank | 0.8 liters |
| Stirring speed | 2600 rpm |
| Settling time | 30 minutes |

At the end of the settling time, ⅔ of the wash water are removed and an equal volume of fresh solution of ammonium bicarbonate is again added. The operation is repeated under the same conditions for seven times. Finally, the hydrocarbon solution is dried by evaporation and 31 ppm of uranium are found in the thus obtained polymer.

EXAMPLE No. 6

By repeating the Example No. 5, except that a solution of ammonium carbonate is used, after four washings each having a duration of 5 minutes, the purified polymer has an uranium content of 34ppm.

What we claim is:

1. The process of removing the uranium contained in a hydrocarbon solution of polybutadiene prepared in the presence of a catalyst system including tetrallyl uranium or tetramethoxyl uranium, a reducing compound of a metal belonging to the 2nd or 3rd groups of the Periodic System and a Lewis acid, in a hydrocarbon solvent, which comprises thoroughly mixing said hydrocarbon solution with an aqueous solution of ammonium carbonate at a concentration of from 1 to about 5%, and then separating said mixture into an organic phase and an aqueous phase containing all the uranium removed from said butadiene.

2. A process as claimed in claim 1 wherein the ratio between the hydrocarbon solution and the aqueous solution of ammonium carbonate is 0.1: 1 to 10: 1.

3. A process as claimed in claim 1, wherein the ammonium carbonate is used in the presence of an excess, with respect to the stoichiometric value, of carbon dioxide or ammonia.

4. A process as claimed in claim 1, wherein the aqueous phase containing all the uranium removed from the polymer is passed to a recovery section in which the ammonium carbonate is decomposed and the thus released $CO_2$ and $NH_3$ are distilled, and the condensed vapours, which contain almost all the ammonium carbonate, are recycled for mixing with the hydrocarbon solution, so that the uranium remains in insoluble and filterable form in the aqueous phase as obtained in the said recovery section.

5. A process as claimed in claim 4, wherein the uranium contained in the aqueous phase effluent from the recovery section is separated by filtration.

* * * * *